_(12)_ United States Patent
Suenaga

(10) Patent No.: US 7,239,869 B2
(45) Date of Patent: Jul. 3, 2007

(54) APPARATUS AND METHOD FOR DETECTING LEAVING OF CELLULAR TELEPHONE

(75) Inventor: Shoji Suenaga, Saitama (JP)

(73) Assignee: Pioneer Corporation, Tokyo (JP)

( * ) Notice: Subject to any disclaimer, the term of this patent is extended or adjusted under 35 U.S.C. 154(b) by 484 days.

(21) Appl. No.: 10/443,992

(22) Filed: May 23, 2003

(65) Prior Publication Data

US 2003/0224805 A1 Dec. 4, 2003

(30) Foreign Application Priority Data

May 28, 2002 (JP) .......................... P2002-153458

(51) Int. Cl.
*H04M 11/00* (2006.01)
(52) U.S. Cl. .................. 455/421; 455/456.1; 455/41.2; 340/571; 701/214
(58) Field of Classification Search ................ 455/421, 455/456, 41.2, 41.1, 550.1, 420, 414.1, 456.1; 340/571; 701/214; 713/176
See application file for complete search history.

(56) References Cited

U.S. PATENT DOCUMENTS 6,297,737 B1 * 10/2001 Irvin ........................ 340/571
6,813,498 B1 * 11/2004 Durga et al. .............. 455/456.1
2001/0002211 A1    5/2001 Lee
2002/0197955 A1 * 12/2002 Witkowski et al. ........... 455/41
2003/0159044 A1 *  8/2003 Doyle et al. ................ 713/176
2003/0171111 A1 *  9/2003 Clark ....................... 455/414.1
2004/0203633 A1 * 10/2004 Knauerhase et al. ...... 455/414.1
2004/0203697 A1 * 10/2004 Finn .......................... 455/420
2004/0203998 A1 * 10/2004 Knauerhase et al. ...... 455/550.1

FOREIGN PATENT DOCUMENTS

EP      1 133 119 A2     9/2001
WO     WO 01/28274 A1    4/2001

\* cited by examiner

*Primary Examiner*—Joseph Feild
*Assistant Examiner*—Phuoc Doan
(74) *Attorney, Agent, or Firm*—Sughrue Mion, PLLC

(57) ABSTRACT

There is provided a Bluetooth module part for establishing wireless connection to a cellular telephone having a Bluetooth function and a microcomputer for determining that the cellular telephone has been left when connection to the cellular telephone has continued for a certain time, and the cellular telephone is provided with any one of a function of providing unique information identifying the self and a function of obtaining present position information of the self, and there is provided the microcomputer for sending at least one of a device ID and the present position information to a preset communication destination through the cellular telephone when the microcomputer determines that the cellular telephone has been left.

4 Claims, 3 Drawing Sheets

APPARATUS AND METHOD FOR DETECTING LEAVING OF CELLULAR TELEPHONE

CROSS REFERENCE OF RELATED APPLICATION

This application is based on and claims priority with respect to Japanese Patent Application No. 2002-153458 filed on May 28, 2002, the entire content of which is incorporated herein by reference.

BACKGROUND OF THE INVENTION

1. Field of the Invention

The present invention relates to an apparatus and method for detecting leaving of a cellular telephone.

2. Description of the Related Art

As a method for preventing leaving of a cellular telephone, there is conventionally a method in which when a cellular telephone is left in a particular installation place of a vehicle to go away from the vehicle, a sensor detects presence of the cellular telephone and notification is provided by ringing a buzzer.

However, in the conventional method for preventing the leaving of the cellular telephone described above, the leaving of the cellular telephone cannot be detected when the cellular telephone is left in a place where the sensor cannot detect, so that there are problems that a user cannot be notified of the leaving of the cellular telephone and also a left place cannot be identified and reported.

SUMMARY OF THE INVENTION

The invention is implemented in view of the circumstances described above, and an object of the invention is to provide an apparatus and method for detecting leaving of a cellular telephone capable of surely detecting the leaving of the cellular telephone and also identifying a place where the cellular telephone is left to notify a user.

According to one aspect of the invention, there is provided an apparatus for detecting leaving of a cellular telephone which comprises connection means (Bluetooth module part 101) for establishing wireless connection to a cellular telephone having a short-haul wireless communication function, and leaving determination means (microcomputer 105) for determining that the cellular telephone has been left when connection to the cellular telephone has continued for a certain time, wherein the cellular telephone is provided with any one of functions of providing unique information identifying the self and obtaining present position information of the self, and there is provided control means (microcomputer 105) for sending at least one of the unique information and the present position information to a preset communication destination through the cellular telephone when the leaving determination means determines that the cellular telephone has been left.

According to another aspect of the invention, there is provided a method for detecting leaving of a cellular telephone in which when wireless connection established to a cellular telephone having a short-haul wireless communication function and any one of functions of providing unique information identifying the self and obtaining present position information of the self has continued for a certain time, it is determined that the cellular telephone has been left and at least one of the unique information and the present position information is sent to a preset communication destination.

According to the configuration described above, leaving of a cellular telephone is detected based on wireless connection which has continued for a certain time, and at least one of unique information identifying the self and present position information is sent to a preset communication destination. By installing the present apparatus in places so-called hot spots such as a restaurant, a pub, a hotel, an inn and an amusement park, a user of the cellular telephone can identify a left place. Also, by sending the present position information, a position of a vehicle itself can be identified even in case that the left place of the cellular telephone is, for example, a vehicle and its vehicle is stolen, so that the cellular telephone can be located easily. Also, even in case of a vehicle of other people, a position of its vehicle can be identified.

According to another aspect of the invention, there is provided an apparatus for detecting leaving of a cellular telephone which comprises connection means (Bluetooth module part 101) for establishing wireless connection between a vehicle-mounted device and a cellular telephone having a short-haul wireless function, detection means for detecting that an accessory switch of a vehicle became an off state, and leaving determination means (microcomputer 105) for determining that the cellular telephone has been left inside the vehicle when connection to the cellular telephone has continued for a certain time since the off state of the accessory switch was detected by the detection means, and is characterized in that the vehicle-mounted device is provided with at least one of functions of providing any one of unique information identifying the self and vehicle information identifying the vehicle and obtaining present position information of the vehicle, and there is provided with control means (microcomputer 105) for sending at least one of the unique information, the vehicle information and the present position information obtained by establishment of the wireless connection to a preset communication destination through the cellular telephone when the leaving determination means determines that the cellular telephone has been left.

According to another aspect of the invention, there is provided a method for detecting leaving of a cellular telephone in which when wireless connection between a cellular telephone having a short-haul wireless function and a vehicle-mounted device having at least one of functions of providing any one of unique information identifying the self and vehicle information identifying a vehicle and obtaining present position information of the vehicle has continued for a certain time since an accessory switch of the vehicle became an off state, it is determined that the cellular telephone has been left inside the vehicle and at least one of the unique information, the vehicle information and the present position information obtained by establishment of the wireless connection is sent to a preset communication destination through the cellular telephone.

According to the configuration described above, leaving of a cellular telephone is detected based on an off state of an accessory switch of an engine key of a vehicle and wireless connection which has continued for a certain time, and at least one of unique information identifying the self, vehicle information and present position information is sent to a preset communication destination. Particularly, even in case that it has been left in a vehicle of other people naturally and my own vehicle is stolen, the left case can be identified.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

An embodiment of the invention will be described below with reference to the drawings.

Figure 1:
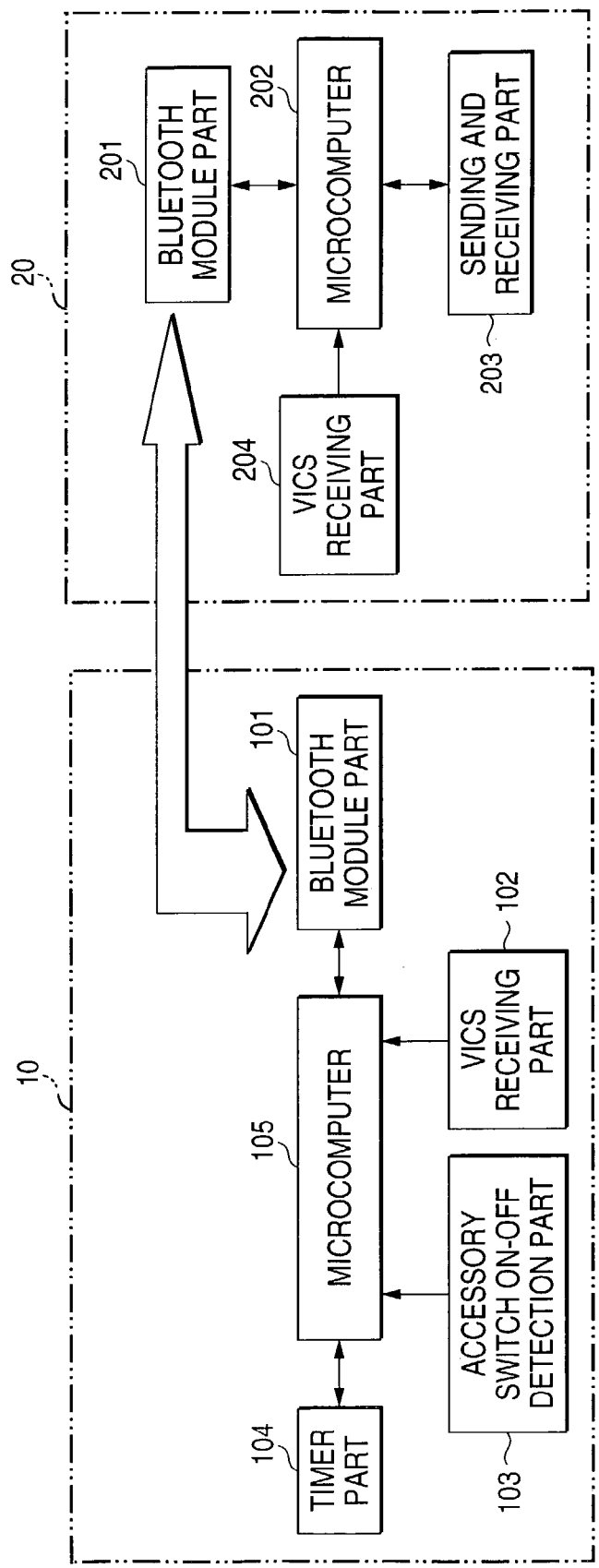
FIG. 1 is a block diagram showing a configuration of an apparatus for detecting leaving of a cellular telephone according to an embodiment of the invention.

FIG. 1 is a block diagram showing a configuration of an apparatus for detecting leaving of a cellular telephone according to the embodiment of the invention, and shows the case used in a car stereo (vehicle-mounted electronic device) 10. Also, the apparatus for detecting leaving of a cellular telephone shown in FIG. 1 has a Bluetooth function which is a short-haul wireless communication function and is constructed so as to be able to link to a cellular telephone having the same Bluetooth function by wireless.

In FIG. 1, the apparatus for detecting leaving of a cellular telephone according to the present embodiment comprises a Bluetooth module part 101, a VICS receiving part 102, an accessory switch on-off detection part 103, a timer part 104, and a microcomputer 105. The Bluetooth module part 101 sends and receives a signal in conformity with Bluetooth standards. The VICS receiving part 102 receives road traffic information sent from a road traffic information system. The accessory switch on-off detection part 103 detects on-off of an accessory switch of an engine key. The timer part 104 does a time count with an input of a timer on signal from the microcomputer 105 and stops the time count by an input of a timer off signal.

The microcomputer 105 controls each the part of the apparatus, and comprises a CPU, RAM, ROM and others (not shown). Programs for controlling the CPU are written into the ROM, and the RAM is used for operation of the CPU. It is constructed so that a power source is always supplied to the microcomputer 105 and the accessory switch on-off part 103, and it is constructed so that the on-off of the accessory switch of the engine key is always monitored.

Figure 2:
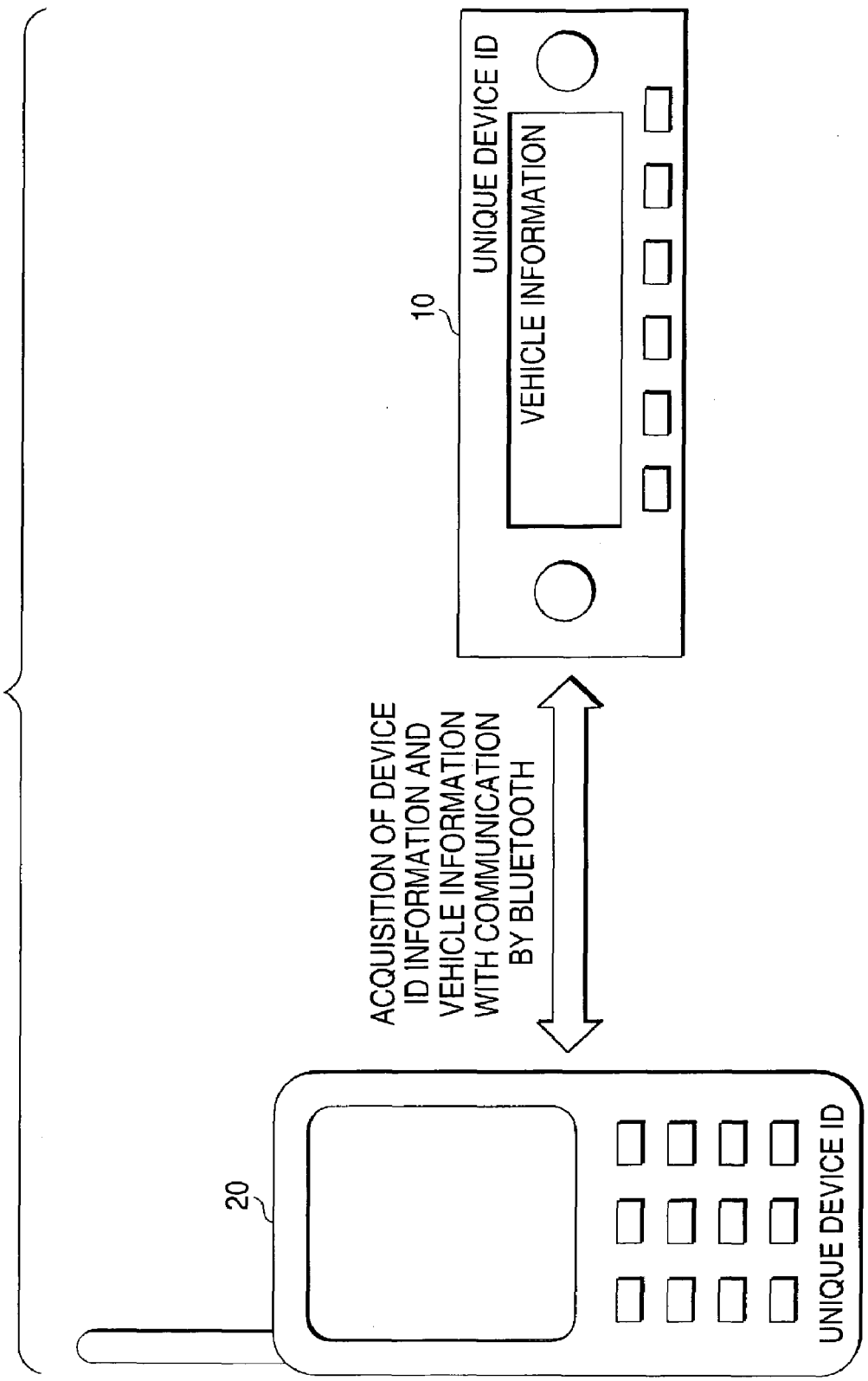
FIG. 2 is a diagram describing a link establishment operation between a cellular telephone and a car stereo to which the apparatus for detecting leaving of a cellular telephone according to the embodiment of the invention is applied.

In the Bluetooth module part 101, the VICS receiving part 102 and the timer part 104, on-off of a power source is controlled by the microcomputer 105. When on of the accessory switch of the engine key is detected by the accessory switch on-off part 103, the microcomputer 105 operates the Bluetooth module part 101 and establishes a link to an adjacent electronic device (in the embodiment, a cellular telephone 20) having a Bluetooth function. Also, it operates the VICS receiving part 102 and starts to receive road traffic information. Then, when the link to the adjacent electronic device having the Bluetooth function is established, a device ID of the self is given and received each other as shown in FIG. 2. Incidentally, a device ID of the car stereo 10 to which the apparatus is applied is written into the ROM of the microcomputer 105. The device ID of the car stereo functions as unique information identifying the self. This device ID is a unique ID which the Bluetooth module part 101 has, and functions as the device ID of the car stereo by incorporating this module part 101 into the car stereo. Further, information (a vehicle inspection number, a license plate number) unique to a vehicle mounted for theft prevention is previously registered in the car stereo 10 and in the invention, this information is used as vehicle information identifying the vehicle.

Then, when off of the accessory switch of the engine key is detected by the accessory switch on-off part 103 after a link to the cellular telephone 20 is established, the timer part 104 is operated at that point of time and it is determined whether or not the link to the cellular telephone 20 is released within a certain time. In this determination, communication quality (for example, error rate) is used. The microcomputer 105 decides that the link is released when it has become certain communication quality or less.

When the microcomputer 105 decides that the link to the cellular telephone 20 is not released within the certain time, it is decided that the cellular telephone 20 has been left, and the device ID (information identifying the self) of the car stereo 10 to which the apparatus is applied and/or the vehicle information are sent to a preset communication destination (for example, a communication address of a personal computer which a user of the cellular telephone 20 owns) through the cellular telephone 20. In this case, when road traffic information has been received by the VICS receiving part 102, the present position is calculated from that information and its position information (present position information) is also sent. After performing processing for providing notification of leaving of the cellular telephone 20, power sources of the Bluetooth module part 101, the VICS receiving part 102 and the timer part 104 are turned off.

On the other hand, the cellular telephone 20 comprises a Bluetooth module part 201, a microcomputer 202, a sending and receiving part 203, and a VICS receiving part 204. The Bluetooth module part 201 sends and receives a signal in conformity with Bluetooth standards. The microcomputer 202 comprises a CPU, RAM, ROM and others (not shown), and controls the Bluetooth module part 201 and the sending and receiving part 203. Also, in the CPU, a device ID of the cellular telephone 20 functions as unique information identifying the self. This device ID is a unique ID which the Bluetooth module part 201 has, and functions as the device ID of the cellular telephone by incorporating this module part 201 into the cellular telephone.

That is, the microcomputer 202 operates the Bluetooth module part 201 and establishes a link to an adjacent electronic device (in the embodiment, a car stereo 10) having a Bluetooth function. Then, sending of the device ID of the cellular telephone 20, present position information obtained based on road traffic information obtained by the VICS receiving part 204 of the cellular telephone 20 or the device ID of the car stereo 10 acquired through the Bluetooth module part 201 and/or the vehicle information to a sending destination by the sending and receiving part 203 is started. After establishment of a line, the device ID of the cellular telephone 20 or the car stereo 10 and/or the vehicle information are sent. Also, in the case of acquiring present position information of a vehicle from the car stereo 10 similarly, this present position information is also sent. By the way, in consideration of the case that a function of calculating the present position is absent in the car stereo 10, after establishment of a link, when a device ID, etc. cannot be acquired from the car stereo 10, present position information and a device ID of the cellular telephone 20 itself are sent to a sending destination and notifies of leaving of the cellular telephone.

Figure 3:
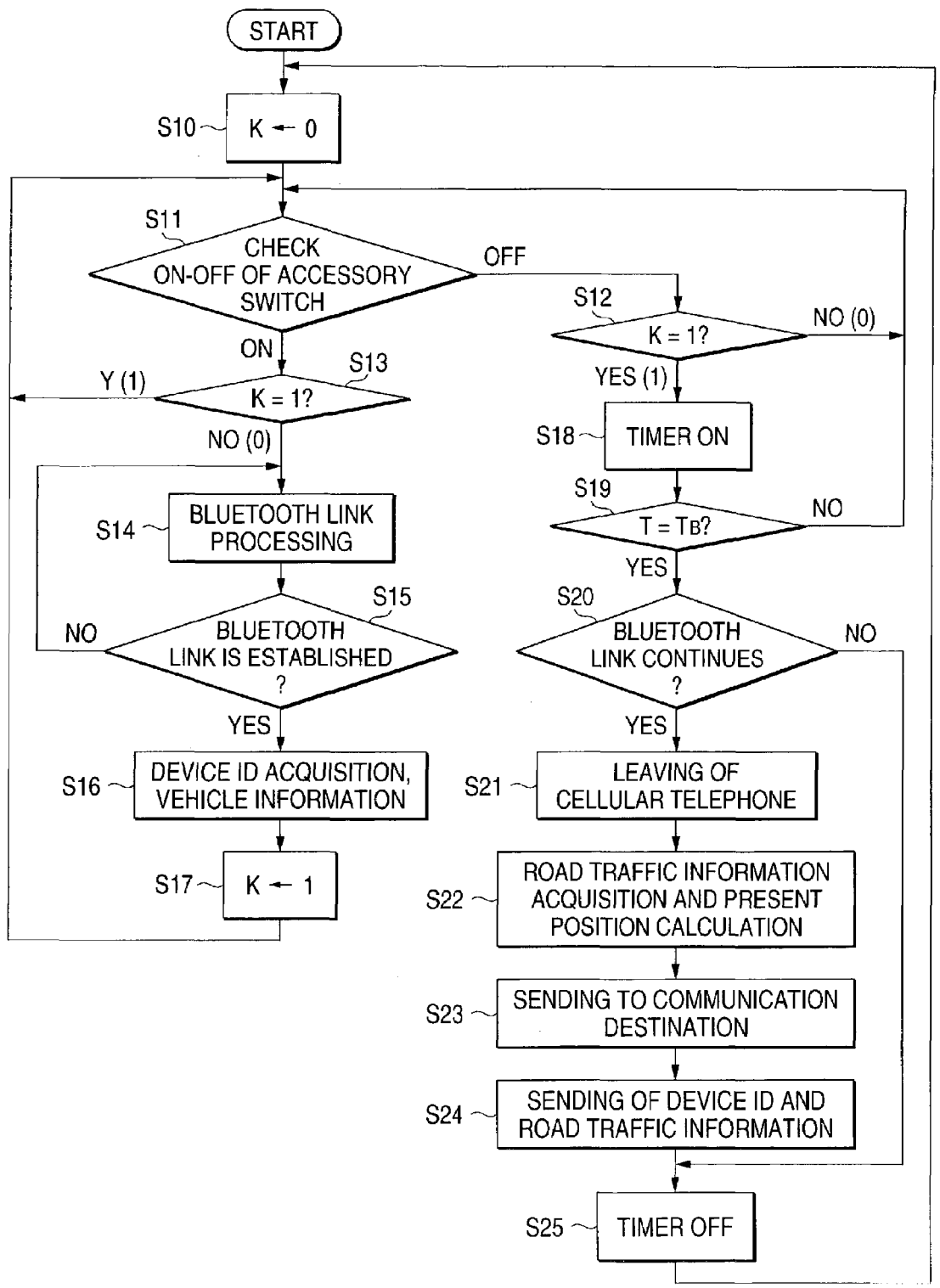
FIG. 3 is a flowchart describing an operation of the apparatus for detecting leaving of a cellular telephone according to the embodiment of the invention.

Next, an operation of the apparatus for detecting leaving of a cellular telephone according to the embodiment will be described with reference to a flowchart shown in FIG. 3.

First, in step 10, a flag K is set to "0". Next, in step 11, on-off of an accessory switch of an engine key is checked. When the accessory switch is off, it is determined whether or not the flag K is "1" in step 12. In this case, it is set to "0" in step 10, so that the flowchart returns to step 11.

On the other hand, when the accessory switch is on, it is determined whether or not the flag K is "1" in step 13. In this case, it is set to "0" in step 10, so that Bluetooth link processing is performed in steps 14 and 15. At this time, when there is a cellular telephone 20 in the vicinity, processing for establishing a link to the cellular telephone is performed. When a Bluetooth link is established, a device ID (unique information) of a car stereo 10 and vehicle information are acquired in step 16. After acquiring the device ID (unique information) of the car stereo 10 and the vehicle information, it returns to step 11. Incidentally, when it is decided that the link is established in step 15 and the device ID of the car stereo 10 and the vehicle information cannot be obtained after a lapse of predetermined time since a point of time that the link was established, a flag to the effect that they cannot be obtained is set.

When it returns to step 11, the on-off of the accessory switch of the engine key is checked again. When the accessory switch is on, it proceeds to step 13 and it is determined whether or not the flag K is set to "1". That is, while on of the accessory switch continues, processing of step 11 and step 13 is repeated. Then, when the accessory switch becomes off in this state, it proceeds from step 11 to step 12. A setting value of the flag K is determined in step 12 and in this case, it is set to "1" in step 17, so that it proceeds to step 18.

When it proceeds to step 18, a timer is turned on and measurement of time is started. Then, while elapsed time T is shorter than predetermined time $T_B$ in step 19, processing of step 11, step 12, step 18 and step 19 is repeated. Incidentally, once the timer on processing of step 18 is performed, it continues until it becomes off, so that reset and start are not performed every time step 18 is repeated. When the elapsed time T reaches the predetermined time $T_B$, it is determined whether or not the Bluetooth link continues in step 20.

When the Bluetooth link does not continue, it returns to step 10 after the timer is turned off in step 25. On the contrary, when the Bluetooth link continues, it is decided that the cellular telephone 20 has been left in step 21, and road traffic information is acquired to calculate the present position in step 22. This processing is performed even beyond a service range of a road traffic information system. Of course, the present position cannot be calculated when the road traffic information cannot be acquired. In that case, after checking a receiving state of the VICS receiving part 204 of the cellular telephone 20 and performing road traffic information acquisition and present position calculation processing, it is sent to a communication destination through the cellular telephone 20 in step 23. Then, when a line is connected, the device ID of the car stereo 10, the vehicle information and present position information of a vehicle are sent. After performing this processing, the timer is turned off in step 25 and it returns to step 10 and the processing similar to the above is repeated. Incidentally, when a flag to the effect that any of the device ID (unique information), the vehicle information or the present position information of the vehicle cannot be acquired from the car stereo 10 is set, present position information or a device ID of the cellular telephone is sent. Further, sent information includes the device ID, the vehicle information and the present position information, but in the invention, by sending at least one information of these, it is detected that the cellular telephone has been left, and a left place is identified.

Thus, in accordance with the apparatus for detecting the leaving of the cellular telephone according to the embodiment, when connection by Bluetooth is established to the cellular telephone 20 having the Bluetooth function and off of the accessory switch of the engine key of the vehicle is detected while this connection is established, in the case that the connection has continued for a certain time since that time, it is determined that the cellular telephone 20 has been left and the device ID of the car stereo 10, the vehicle information or the present position information are sent to a preset communication destination through the cellular telephone 20, so that a user of the cellular telephone 20 can identify a left place of the cellular telephone 20.

By installing the present apparatus in places called hot spots such as a restaurant, a pub, a hotel, an inn and an amusement park, a user of the cellular telephone 20 can identify a left place. Also, by sending the present position information, a position of a vehicle itself can be identified even in case that the left place of the cellular telephone 20 is, for example, a vehicle and its vehicle is stolen, so that the cellular telephone can be located easily. Also, even in case of a vehicle of other people, a position of its vehicle can be identified. Incidentally, in this case, at least one information of the present position information and a device ID previously stored in the cellular telephone is sent. That is, by sending the device ID of the cellular telephone to a sending destination, a user can be caused to recognize that it has been left, and also by checking a place capable of establishing a link to its cellular telephone, a left place can be identified. Also, by sending the present position information of the cellular telephone to the sending destination, the user can be notified of an existence position of the cellular telephone itself, so that the cellular telephone can be located easily.

Incidentally, in the embodiment, it is constructed so as to turn off power sources of the Bluetooth module part 101, the VICS receiving part 102 and the timer part 104 after performing processing for providing notification of leaving of the cellular telephone 20, but it may be constructed so as to perform operations at certain interval of time and perform sending to a communication destination. By being constructed thus, in case that a vehicle in which the cellular telephone 20 has been left is stolen, its destination can be traced.

Also, in the embodiment, the case of being applied to the car stereo is described, but it goes without saying that it can be applied to all the vehicle-mounted electronic devices such as car navigation. Particularly, in the case of being applied to a car navigation device, satellite position measurement information can be obtained from a GPS satellite, so that the present position can be calculated in more detail wherever it is. Also, it goes without saying that a GPS receiving part may be provided in the cellular telephone.

As described above, according to the invention, by detecting leaving of a cellular telephone and sending at least one of unique information identifying the self and present position information (at least one of unique information, vehicle information and present position information in the case of establishing wireless connection to a vehicle-mounted device) to a preset communication destination, the leaving of the cellular telephone can be detected and a left place of the cellular telephone can be identified to notify a user.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An apparatus for detecting leaving of a cellular telephone having at least one of a function of providing unique information identifying the cellular telephone and a function of obtaining present position information of the cellular telephone, the apparatus comprising:

a connection section adapted to establish wireless connection to a cellular telephone having a short-haul wireless communication function; and a leaving determination section adapted to determine that the cellular telephone has been left when connection to the cellular telephone has continued for a certain time; and a control section adapted to send at least one of the unique information and the present position information to a preset communication destination through the cellular telephone when the leaving determination section determines that the cellular telephone has been left.

2. An apparatus for detecting leaving of a cellular telephone, comprising:

a connection section adapted to establish wireless connection between a vehicle-mounted device that the vehicle-mounted device having at least one of a function of providing any one of unique information identifying the vehicle-mounted device and vehicle information identifying the vehicle and a function of obtaining present position information of the vehicle, and a cellular telephone having a short-haul wireless function;

a detection section adapted to detect that an accessory switch of a vehicle became an off state;

a leaving determination section adapted to determine that the cellular telephone has been left inside the vehicle when connection to the cellular telephone has continued for a certain time since the off state of the accessory switch was detected by the detection section; and a control section adapted to send at least one of the unique information, the vehicle information and the present position information obtained by establishment of the wireless connection to a preset communication destination through the cellular telephone when the leaving determination section determines that the cellular telephone has been left.

3. A method for detecting leaving of a cellular telephone having at least one of a function of providing unique information identifying the cellular telephone and a function of obtaining present position information of the cellular telephone, the method comprising:

establishing a wireless connection to a cellular telephone having a short-haul wireless communication function;

determining that the cellular telephone has been left when connection to the cellular telephone has continued for a certain time; and sending at least one of the unique information and the present position information to a preset communication destination through the cellular telephone when the cellular telephone is determined to have been left.

4. A method for detecting leaving of a cellular telephone comprising:

determining that the cellular telephone has been left inside the vehicle when wireless connection between a cellular telephone having a short-haul wireless function and a vehicle-mounted device providing at least one of functions of providing any one of unique information identifying the self and vehicle information identifying a vehicle and obtaining present position information of the vehicle has continued for a certain time since an accessory switch of the vehicle became an off state; and transmitting at least one of the unique information, the vehicle information and the present position information obtained by establishment of the wireless connection to a preset communication destination through the cellular telephone.

* * * * *